Oct. 31, 1944.  E. NASSIMBENE  2,361,645

V-TYPE BELT

Filed Nov. 13, 1942

ERNEST NASSIMBENE
*INVENTOR.*

BY Martin E Anderson
*Attorney*

Patented Oct. 31, 1944

2,361,645

UNITED STATES PATENT OFFICE 2,361,645

V-TYPE BELT

Ernest Nassimbene, Denver, Colo., assignor to The Gates Rubber Company, Denver, Colo., a corporation of Colorado Application November 13, 1942, Serial No. 465,406

6 Claims. (Cl. 74—234)

This invention relates to improvements in belts of the edge driving V-type.

The use of belts for power transmissions is very common today and in many instances gear transmissions have been replaced by V-type belt drives.

Belts of the V-type vary in width from quite narrow to two inches and more. Such belts cooperate with grooved pulleys and are of such width that they do not bottom in the grooves and therefore the tension has a tendency to bend the belt inwardly along its middle, which is objectionable.

V-type belts are, as a rule, provided with one or more layers of cords at or near their neutral axes, which serve to transmit the force or power and which consequently are under considerable tension. It is evident that the tension in the cords which pass over the pulleys, sets up a component of force that tends to bend the belt transversely and since the edges of the belt are in frictional contact with the sides of the pulley groove, the bending movement increases with its distance from the sides of the belt and is maximum at the middle.

The frictional contact between the belt and the pulley is at the two edges of the belt and it is therefore evident that the nearer the tensional forces are to the driving edges of the belt, the nearer we approach to the ideal. If all of the tensional forces could be concentrated along the opposite edges of the belt, it is evident that the forces that tend to bow the belt inwardly would be entirely eliminated and then the central portion would serve merely as a compression member resisting the inwardly acting component of the tensional forces.

It is the object of this invention to produce a belt of such construction that the bending movement due to the presence of any given tension shall be reduced to a minimum.

Another object is to produce a belt having the desired characteristics, that can be constructed by the same methods now used for manufacturing similar belts having layers of tension cords extending entirely across the belts so that present apparatus and moulds may be employed.

Having thus briefly described the invention and its objects, it will now be described in detail, and for this purpose reference will be had to the accompanying drawing in which the invention has been illustrated, and in which.

Figure 1:
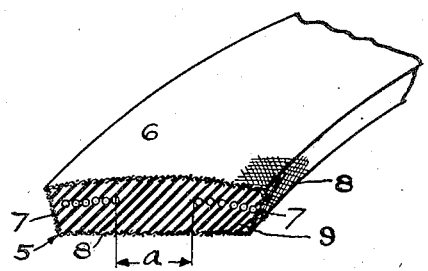
Figure 1 shows a cross section of a belt constructed in accordance with this invention.

Referring now more particularly to Figure 1, reference numeral 5 designates the inner surface of the belt which has been shown transversely straight, the outer surface 6 has been shown outwardly convex and the inclined sides have been designated by reference numerals 7. The belt is made from rubber composition rubberized fabric or rubber compositions mixed with fabric or fiber in a manner quite common and the outer surface is covered with a bias cut fabric which has been designated by reference numeral 8.

In belt transmissions the power transmitted subjects the belt to tensional forces and in belts of the general type to which this invention relates, the tensional forces are resisted by one or more layers of longitudinally extending substantially inextensible cords. The layer or layers of cords extend entirely across the belt. When such belts operate, all of the cords are subjected to more or less tension and when the belts pass around the pulleys, this tension develops a component that tends to bow the belt transversely and inwardly towards the bottom of the groove. Such transverse bending of the belts is objectionable for the reason that it destroys the proportional distribution of the tension in the various cords and causes it to diminish towards the middle of the belt. In addition to this, the bending interferes with the distribution of the pressure and friction between the inclined sides 7 and the correspondingly inclined sides 10 of the belt groove in the pulleys 11. If the inward bending is sufficiently severe the friction and the wear will take place almost entirely near the inner edges of the belt.

Another objectionable result of the inward flexing of the belt is that it increases the tension in the cords nearer the edges and this hastens the destruction of the belt.

In order to produce a belt in which the objectionable transverse bending of the belt is reduced to a practical minimum for that particular type of belt, the cord layer 9, instead of extending entirely across the belt in the usual manner, extends inwardly from both sides a short distance only, leaving a gap $a$ in the middle of the belt in which there are no tension cords. Since the power is transmitted by friction between the inclined sides 10 of the pulley and the inclined end walls 7 of the belt, it is evident that the nearer to the side walls 7 the forces are positioned, the better the belt will function and the smaller will be the component tending to bend the belt inwardly.

In order to effect the desired results in belts of the type illustrated, the tension cords have been concentrated adjacent each side as above explained. The use of a plurality of cords arranged in one or two layers has been found to be very effective for the purpose under consideration and by means of a large number of rather small cords, a better distribution of the stresses is obtained and friction resulting in heat is reduced to the minimum.

In the construction illustrated in Figure 1 that part of the belt positioned in the middle areas whose width has been designated by $a$ merely serves to resist inward pressure and is subjected to practically no longitudinal tension because the inextensible cords prevent the body of the belt from being elongated under the stresses to which it is subjected during normal operation.

Figure 2:
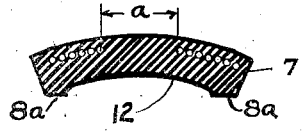
Figure 2 shows the invention embodied in a belt of slightly modified form.

The belt illustrated in Figure 2 differs from that shown in Figure 1 in this, that the inner wall is formed from two narrow flat areas $8a$ that are connected by an outwardly convex surface 12. In other respects the belt is constructed in the manner shown and described in connection with Figure 1.

Figure 3:
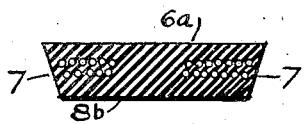
Figure 3 shows a still further modification.

In Figure 3, a belt has been shown in which the outer surface $6a$ and the inner surface $8b$ are both transversely straight. Such a belt like the belt shown in Figures 1 and 2 are suitable for use in transmitting power between flat surfaced and grooved pulleys.

Figure 4:
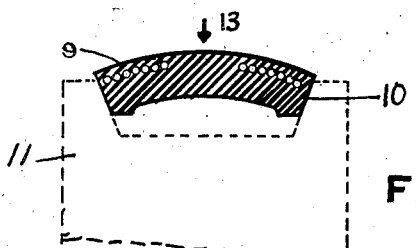
Figure 4 is a fragmentary section through a belt and through a portion of a grooved pulley showing the belt in operative position on the latter.

In Figure 4, a belt like that illustrated in Figure 2 has been shown in position and the force tending to bend the belt transversely towards the bottom of the groove has been indicated by the arrow 13.

Figure 5:
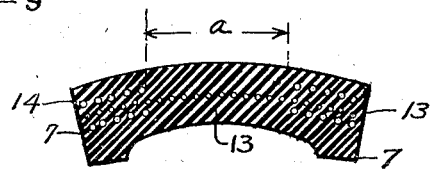
Figure 5 is a transverse section showing another embodiment of the invention.

In Figure 5 a belt has been shown in which a single layer of cords or fabric 13 extends substantially the entire width of the belt and in which two or more additional layers 14 of cord are positioned adjacent each edge. In this embodiment the layer 13 may not be formed from pre-stretched cords and the cords near the center, in the space designated by $a$ will never be subjected to any appreciable tension and will therefore produce no inward bowing. The cords in layers 14 are preferably pre-stretched to render them substantially inextensible and they may also be larger and stronger than the cords in layer 13.

It is evident from the above description when considered in connection with the drawings that belts made in accordance with this invention can be considered as divided into three transverse sections, the one located at the middle and designated by $a$ in the figures is extensible transversely bendable and resilient, while the sections to the sides of the section $a$ are substantially inextensible due to the presence of the pre-stretched cords in layers 9 and 14.

Particular attention is called to the fact that belts made in accordance with this invention can be constructed in accordance with usual methods and molds, whereas belts that depend on rigid transverse inserts to resist inward flexure are difficult to manufacture and short lived due to the localization of the strains adjacent the inserts.

In the drawing a plurality of cords has been shown and in Figure 3 the cords have been shown as comprising two layers. The number of layers is not of any considerable importance and depends on the power to be transmitted, but for reasons pointed out above more desirable results are obtained with a plurality of cords of small diameter than with fewer cords of larger diameter and it is contemplated therefore to form the cord layer or layers from ordinary cord fabric wound longitudinally.

Attention is called to the fact that the belt described and claimed herein is of uniform construction throughout its entire length and that it is bendable transversely about a longitudinal central axis perpendicular to the cross section thereof.

Having described the invention what is claimed as new is:

1. A belt of the side driving V-type of uniform construction at all points along its length having an extensible and transversely bendable central portion and substantially inextensible side portions.

2. A belt of the side driving V-type of uniform construction at all points along its length having substantially inextensible side portions spaced by an integral, extensible, and transversely bendable resilient center portion.

3. A transversely bendable belt of the side driving V-type of uniform construction at all points along its length formed principally from rubber composition, at least one layer of substantially inextensible cords positioned substantially in the neutral plane and extending inwardly from each side, the layer being separated into two parts along the center line of the belt, by resilient, extensible material.

4. A transversely bendable belt of the side driving V-type of uniform construction at all points along its length, formed principally from resilient rubber composition, and a plurality of longitudinally extending tension resisting cords positioned adjacent the neutral axis, the number of cords per unit width of the belt being greater nearer the edges than at the center, the middle section of the belt being longitudinally extensible.

5. A transversely bendable belt of the side driving V-type of uniform construction at all points along its length, formed principally from resilient rubber composition and longitudinally extending tension resisting cords positioned substantially in the neutral axis, in which the extensibility decreases towards the edges of the belt.

6. A transversely bendable belt of the side driving V-type of uniform construction at all points along its length having at least one transverse layer of longitudinally extending cords and, in addition, at least one layer of substantially inextensible cords adjacent each edge and extending inwardly less than half the width of the belt, whereby the belt will have a greater extensibility per unit of tensional force along its middle than near its sides.

ERNEST NASSIMBENE.